(12) United States Patent
O'Neill

(10) Patent No.: US 11,764,560 B2
(45) Date of Patent: Sep. 19, 2023

(54) BUS SPLICE

(71) Applicant: Schneider Electric USA, Inc., Andover, MA (US)

(72) Inventor: Daniel M. O'Neill, Smyrna, TN (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 17/390,563

(22) Filed: Jul. 30, 2021

(65) Prior Publication Data

US 2023/0034457 A1 Feb. 2, 2023

(51) Int. Cl.
*H02G 5/00* (2006.01)
*H01H 1/36* (2006.01)
*H01H 1/50* (2006.01)

(52) U.S. Cl.
CPC .............. *H02G 5/00* (2013.01); *H01H 1/365* (2013.01); *H01H 1/50* (2013.01)

(58) Field of Classification Search
CPC .......... H02G 5/00; H02G 5/007; H01H 1/365; H01H 1/50; H01R 25/145; H01R 4/60
USPC .......................... 200/238, 271, 273, 254, 554
See application file for complete search history.

(56) References Cited

U.S. PATENT DOCUMENTS

| | | | | |
|---|---|---|---|---|
| 4,262,163 A | * | 4/1981 | Durrell | H02G 5/005 174/88 B |
| 5,760,339 A | * | 6/1998 | Faulkner | H02G 5/007 174/88 B |
| 5,821,464 A | * | 10/1998 | Graham | H02G 5/06 174/88 B |
| 6,435,888 B1 | * | 8/2002 | Reed, Jr. | H01R 4/30 174/88 B |
| 9,129,765 B2 | * | 9/2015 | Ozkaya | H01H 9/443 |
| 9,882,366 B2 | * | 1/2018 | Maurer | H02B 1/21 |
| 2015/0380885 A1 | * | 12/2015 | Wildstone | H02J 9/06 307/64 |
| 2016/0156169 A1 | * | 6/2016 | Jaena | H02G 5/007 439/213 |
| 2019/0020159 A1 | * | 1/2019 | Wynnik | H02G 5/007 |

FOREIGN PATENT DOCUMENTS

| | | |
|---|---|---|
| DE | 1096997 B | 1/1961 |
| DE | 1790310 B1 | 8/1975 |
| DE | 102011085517 A1 | 5/2013 |

OTHER PUBLICATIONS

Extended European Search Report dated Nov. 24, 2022 for corresponding European Patent Application No. 22184760.1, 12 pages.

* cited by examiner

*Primary Examiner* — William A Bolton
(74) *Attorney, Agent, or Firm* — Locke Lord LLP

(57) ABSTRACT

A busway system including a first electrical busway section, a second electrical busway section, the first and the second electrical busway sections being offset from each other, a busway joint for coupling the first and the second electrical busway sections. The busway joint including a plurality of busbars, a plurality of splice plates electrically coupled to the plurality of busbars, the plurality of splice plates and the plurality of busbars configured to electrically couple the first and the second electrical busway sections, and a pivot shaft passing through the plurality of busbars and splice plates.

14 Claims, 3 Drawing Sheets

BUS SPLICE

BACKGROUND

Technological Field

The present disclosure relates generally to electrical busways, and more particularly to a novel method of connecting busways.

Description of Related Art

Elongated rectangular flat conductive busbar members are conventionally arranged within electrical busway sections for transporting multi-phase high current electric power through industrial, commercial, and/or residential establishments. Successive elongated busway sections are electrically connected or interlocked together in end-to-end relation to provide electrical continuity between a power source and a power consuming load.

When longitudinally aligned busway sections are electrically interconnected in a conventional installation, self-contained busway joints are typically employed. To preserve the thermal properties of the individual busway sections, busway joints are conventionally constructed with electrically conductive splice plates and insulative plates.

Busway sections are generally manufactured and distributed in the form of pre-manufactured fixed-length sections, so that a number of such electrical busway joints are used to install an extended length busway run in an industrial facility. A busway joint enables two busway sections to electrically connect at a distance different than the fixed length of the busway sections. In many cases, installers are required to delicately insert a busways joint between two sections to close a loop. This procedure can be delicate, time consuming, and can require multiple tools. The typical splicing process is awkward and tedious to complete, furthermore, the joint is energy inefficient due to extra parts being required. Although conventional methods have generally been considered satisfactory for their intended purpose, there is still a need in the art for improved busways assemblies.

It would be desirable to provide a busway joint or busway section that is simpler and easier to connect to the rest of the system. Additionally it would be desirable to provide a busway joint that does not require a worker in the field to lift heavy or delicate busbars to complete installation. The present disclosure provides a solution for this need.

SUMMARY OF THE INVENTION

A busway system includes a first electrical busway section, a second electrical busway section, the first and the second electrical busway sections offset from each other, and a busway joint for coupling the first and the second electrical busway sections. The busway joint includes a plurality of busbars, a plurality of splice plates electrically coupled to the plurality of busbars, the plurality of splice plates and the plurality of busbars configured to electrically couple the first and the second electrical busway sections, and a pivot shaft passing through the plurality of busbars and splice plates. The busway joint is configured to rotate about the pivot shaft, located at the center of the busway joint in order to couple the first electrical busway section and the second electrical busway section.

The busway joint can be configured to selectively move between an inclined position, where the electrical busway sections are disconnected, and a horizontal position where the electrical busway sections are joined by the busway joint. The busway joint can further be configured to move horizontally between the disconnected and connected positions.

It is further considered that the busway joint can further include a support to act as a fulcrum for the pivot shaft. A top section of the support can include a divot to support the pivot shaft. The top section can include a ramp for supporting and easing movement of the busway joint from the first position to the second position the pivot shaft. A divot can denote the location of the pivot shaft in the second position, and be bound on one end by a riser and on the second end by the ramp. A second riser can be used to support the pivot shaft in a disconnected position. The busway joint can include a pin adjacent to the pivot shaft for holding the plurality of busbars and splice joint together.

A method for assembling the busway system is also disclosed. The method includes inserting the busway joint between the first busway section and the second busway section, the busway joint being movable between an inclined and a horizontal position, and rotating the busway joint to contact a first end of the busways joint with the first busway section and a second end of the busway joint with the second busway section. The method can also include sliding the busway joint along an incline to a supporting divot to bring into the second position.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
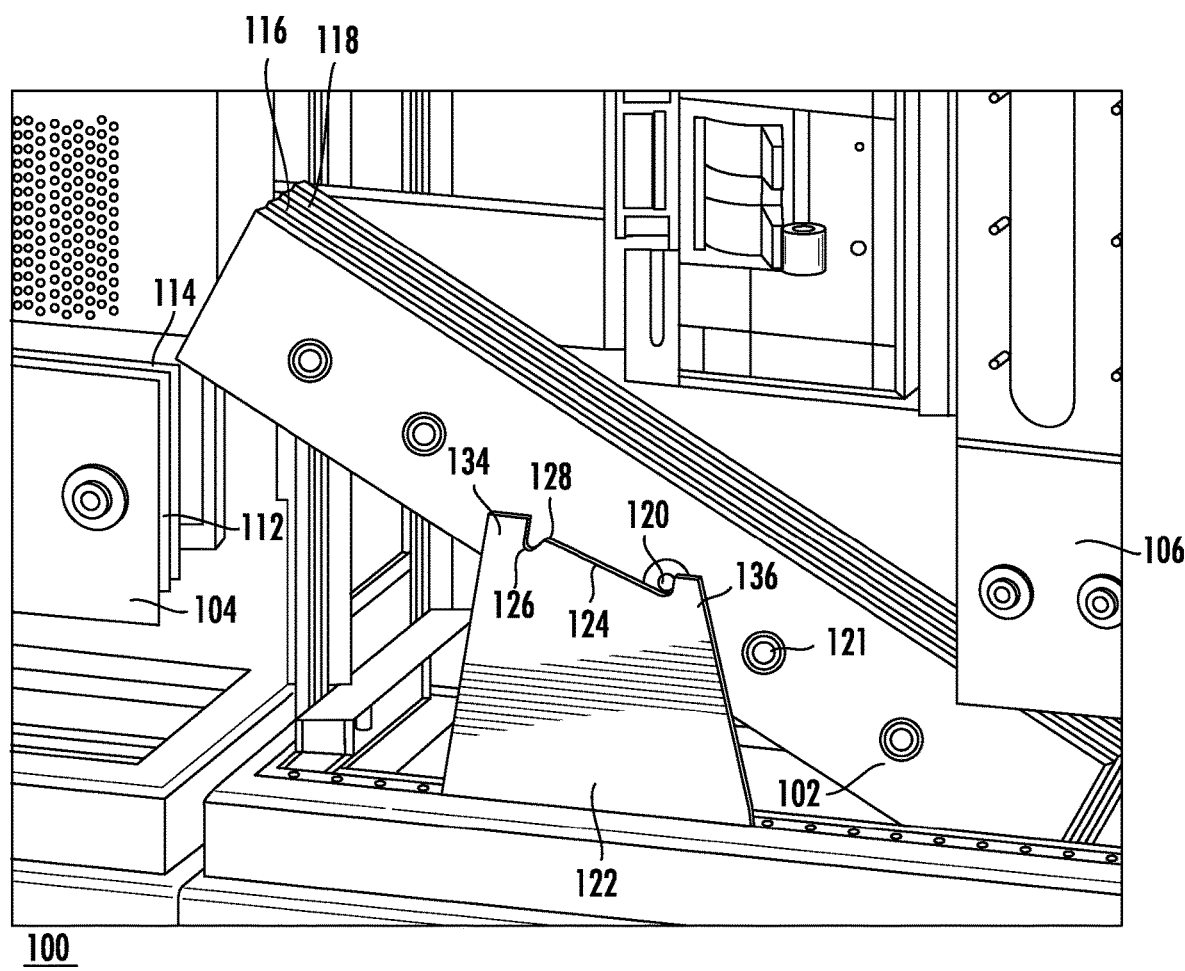
FIG. 1 is a perspective view of an exemplary embodiment of a busway system, showing a decoupled system and a busway connector in an inclined position.
Figure 2:
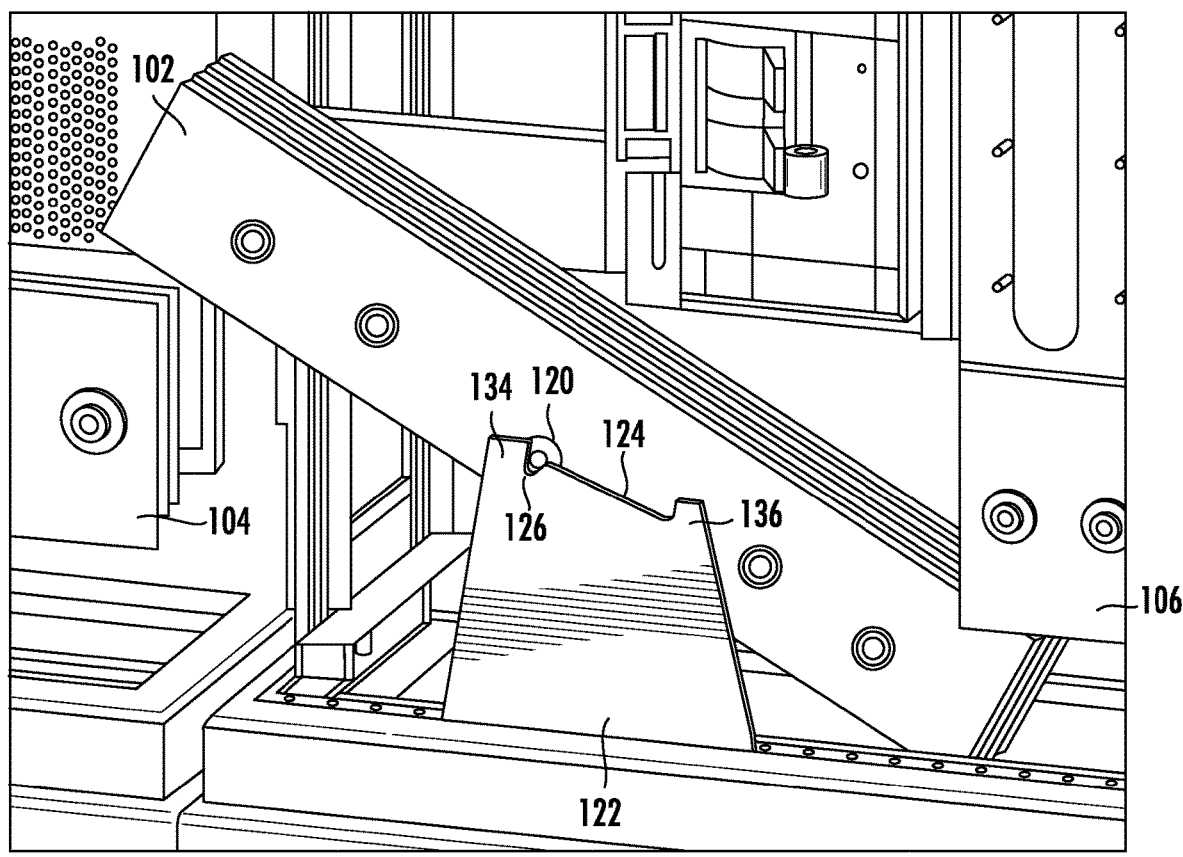
FIG. 2 is a perspective view of an exemplary embodiment of the busway system of FIG. 1, showing the busway connector in an intermediate positon.

Reference will now be made to the drawings wherein like reference numerals identify similar structural features or aspects of the subject disclosure. For purposes of explanation and illustration, and not limitation, a partial view of an exemplary embodiment of a busway in accordance with the disclosure is shown in FIG. 1 and is designated generally by reference character 100. Other embodiments of the busway, the connector, and methods of using such a connector in accordance with the disclosure, or aspects thereof, are provided in FIGS. 2 and 3, as will be described. The systems described herein can be used to simplify construction and assembly of a busway, engage and provide power between busway sections, and minimize part count and assembly weight.

As used in this description and in the claims which follow, the term "phase" shall be taken to include all conductors in different runs of any particular busway, bus duct, or busway joint which carry the same electrical phase, and including those conductors which are used to carry any neutral or ground phase.

Figure 3:
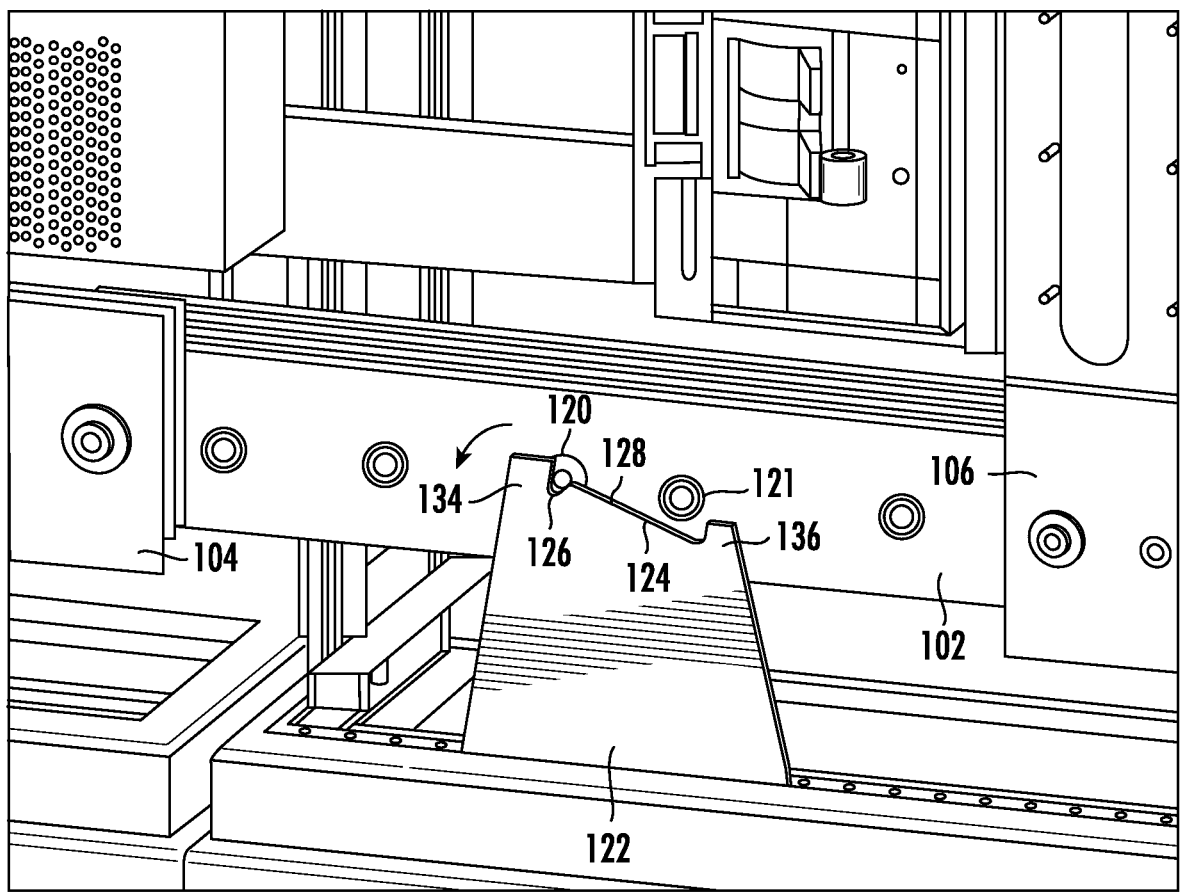
FIG. 3 is a perspective view of an exemplary embodiment of the busway system of FIG. 1, showing the busway connector in an engaged position.

According to an example embodiment, as shown in FIG. 1, the busway system 100 can include a busway joint 102 in a reclined or open positon, which can rotate to a horizontal or closed position (as shown in FIG. 3). The system 100 includes a first electrical busway section 104, a second electrical busway section 106, joinable in a substantially longitudinally aligned end-to-end relationship between an electric power source and a load, and the busway joint 102 for coupling the first and the second electrical busway sections 104/106. In one embodiment, busway system 100 is configured to connect to a conventional 3-phase electrical distribution system. In other embodiments, busway system 100 may be configured to connect with an electrical distribution system having any number of AC electrical phases. In still other embodiments, busway system 100 may be configured to connect with a DC electrical distribution system.

As further shown in FIG. 1, each busway section 104/106 includes a plurality of runs of generally flat elongate busbars 112 and splice plates 114. In this embodiment, each of the busbars 112 and splice plates 114 are associated with a specific electrical phase of an electrical distribution system, and are configured for operable connection with a corresponding phase, ground, or neutral bus within the electrical distribution system. The rotatable joint 102 also includes a plurality of busbars 116 and joints 118 for joining each of the sections 104/106 to corresponding phases.

The busway joint 102 includes a pivot shaft 120 passing through the center of the plurality of busbars 116 and splice plates 118, and a pin 121 adjacent to the pivot shaft 120 for holding the plurality of busbars 116 and splice joints 118 together. The busway joint 102 rotates about the pivot shaft 120 from the inclined positon, where the two sections 104/106 are not connected, as shown in FIG. 1, to the position depicted in FIG. 3 where the two section 104/106 are connected. While rotating, the busway joint 102 also slides along the support 122. The support 122 acts as a fulcrum and guide for the pivot shaft 120. The support 122 has a top surface 124 bounded by a pair of risers 134/136 on each end to prevent the pivot shaft 120 from sliding away. The top surface 124 includes a ramp 128, along which the pivot shaft 120 slides. The sliding motion and ramp 128 allows for a tighter and more compact assembly, further making the assembly easier to manage for workers. The pivot shaft 120 slides up the ramp 128 to a divot 126 that supports the pivot shaft 120 while the busway joint 102 rotates to the connected position. Since the busway joint 102 is balanced and can be pivoted at the center, the busway joint 102 is easy to manipulate relative to typical busway joints.

The methods and systems of the present disclosure, as described above and shown in the drawings, provide for busway for that can be used to simplify construction and assembly, engage and provide power between connections, and minimize part count and assembly weight. Further, while a method of assembling the busway has been discussed, it is also considered that the pivoting motion also improves serviceability of the system, where joints are easier to remove, replace, and service than traditional systems, where joints have to be picked up to be removed. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A busway system comprising:
   a first electrical busway section;
   a second electrical busway section, the first and the second electrical busway sections offset from each other; and
   a busway joint for coupling the first and the second electrical busway sections, the busway joint comprising:
   a plurality of busbars;
   a plurality of splice plates electrically coupled to the plurality of busbars, the plurality of splice plates and the plurality of busbars configured to electrically couple the first and the second electrical busway sections;
   a pivot shaft passing through the plurality of busbars and splice plates; and
   a support to act as a fulcrum for the pivot shaft, wherein a top section of the support includes a divot to support the pivot shaft in at least one position.

2. The busway system of claim 1, wherein the busway joint is configured to rotate about the pivot shaft in order to couple the first electrical busway section and the second electrical busway section.

3. The busway system of claim 1, wherein the busway joint is configured to selectively move between an inclined position wherein the electrical busway sections are disconnected and a horizontal position wherein the electrical busway sections are joined by the busway joint.

4. The busway system of claim 3, wherein the busway joint is configured to move horizontally between the disconnected and connected positions.

5. The busway system of claim 1, wherein the top section includes a ramp for supporting the pivot shaft.

6. The busway system of claim 5, wherein the divot is bounded on one end by a riser and on a second end by the ramp.

7. The busway system of claim 6, further comprising a second riser to support the pivot shaft in a disconnected position.

8. The busway system of claim 1, wherein the busway joint includes a pin adjacent to the pivot shaft for holding the plurality of busbars and splice joints together.

9. The busway system of claim 1, wherein the pivot shaft is at a center of the busway joint.

10. A busway joint for coupling a first electrical busway section and a second electrical busway section, the busway joint comprising:
    a plurality of busbars;
    a plurality of splice plates electrically coupled to the plurality of busbars, the plurality of splice plates and the plurality of busbars configured to electrically couple the first and the second electrical busway sections;
    a pivot shaft passing through the plurality of busbars and splice plates; and
    a support to act as a fulcrum for the pivot shaft, wherein a top section of the support includes a divot to support the pivot shaft.

11. The busway joint of claim 10, wherein the busway joint is configured to rotate about the pivot shaft.

12. The busway system of claim 10, wherein the top section includes a ramp for supporting the pivot shaft.

13. The busway system of claim 10, wherein the divot is bound on one end by a riser and on a second end by a ramp.

14. The busway system of claim 10, wherein the busway joint includes a pin adjacent to the pivot shaft for holding the plurality of busbars and splice joints together.

* * * * *